United States Patent [19]

Green

[11] 4,285,244

[45] Aug. 25, 1981

[54] NON-SYMMETRICAL OVERLOAD PROTECTION DEVICE FOR DIFFERENTIAL PRESSURE TRANSMITTER

[75] Inventor: Norman E. Green, Warrington, Pa.

[73] Assignee: Honeywell Inc., Minneapolis, Minn.

[21] Appl. No.: 121,033

[22] Filed: Feb. 13, 1980

[51] Int. Cl.³ .............................................. G01L 9/00
[52] U.S. Cl. ......................................... 73/720; 73/706
[58] Field of Search ................ 73/706, 716, 717, 718, 73/719, 720, 721, 722; 92/6 D, 94

[56] References Cited

U.S. PATENT DOCUMENTS

| | | | |
|---|---|---|---|
| 187,053 | 2/1877 | Shaw | 73/715 |
| 1,108,721 | 8/1914 | Dodge | 73/861.47 |
| 3,313,158 | 4/1967 | Giovanni | 73/720 |
| 3,712,143 | 1/1973 | Weaver et al. | 73/720 |

*Primary Examiner*—Donald O. Woodiel
*Attorney, Agent, or Firm*—Laurence J. Marhoefer; Lockwood D. Burton; Mitchell J. Halista

[57] ABSTRACT

A differential pressure to electrical signal transmitter has a pair of barrier diaphragms and a central control diaphragm located between the barrier diaphragms. Input fluids are applied to respective chambers on the outside of the barrier diaphragms while the chambers between the control diaphragm and the barrier diaphragm are filled by corresponding substantially incompressible fill liquids. The fluid pressure of the two fill fluids are conducted by corresponding fluid channels to respective sides of a displacement sensing element to produce an electrical signal representative of differential pressure. The control diaphragm is biased by spring loaded spacers located on corresponding sides of the control diaphragm. The spacers have fluid passages to permit the respective fill fluids to reach the control diaphragm. A first spacer is concentric with a first chamber on a first side of the control diaphragm while a second spacer is concentric with a second chamber having a smaller diameter than the first chamber and being located on the other side of the control diaphragm. Consequently, the second spacer overlies the peripheral edge of the first chamber to produce a differential input fluid pressure overload response correlated to a non-symmetrical ratio of the directional strength of the displacement sensing element.

10 Claims, 1 Drawing Figure

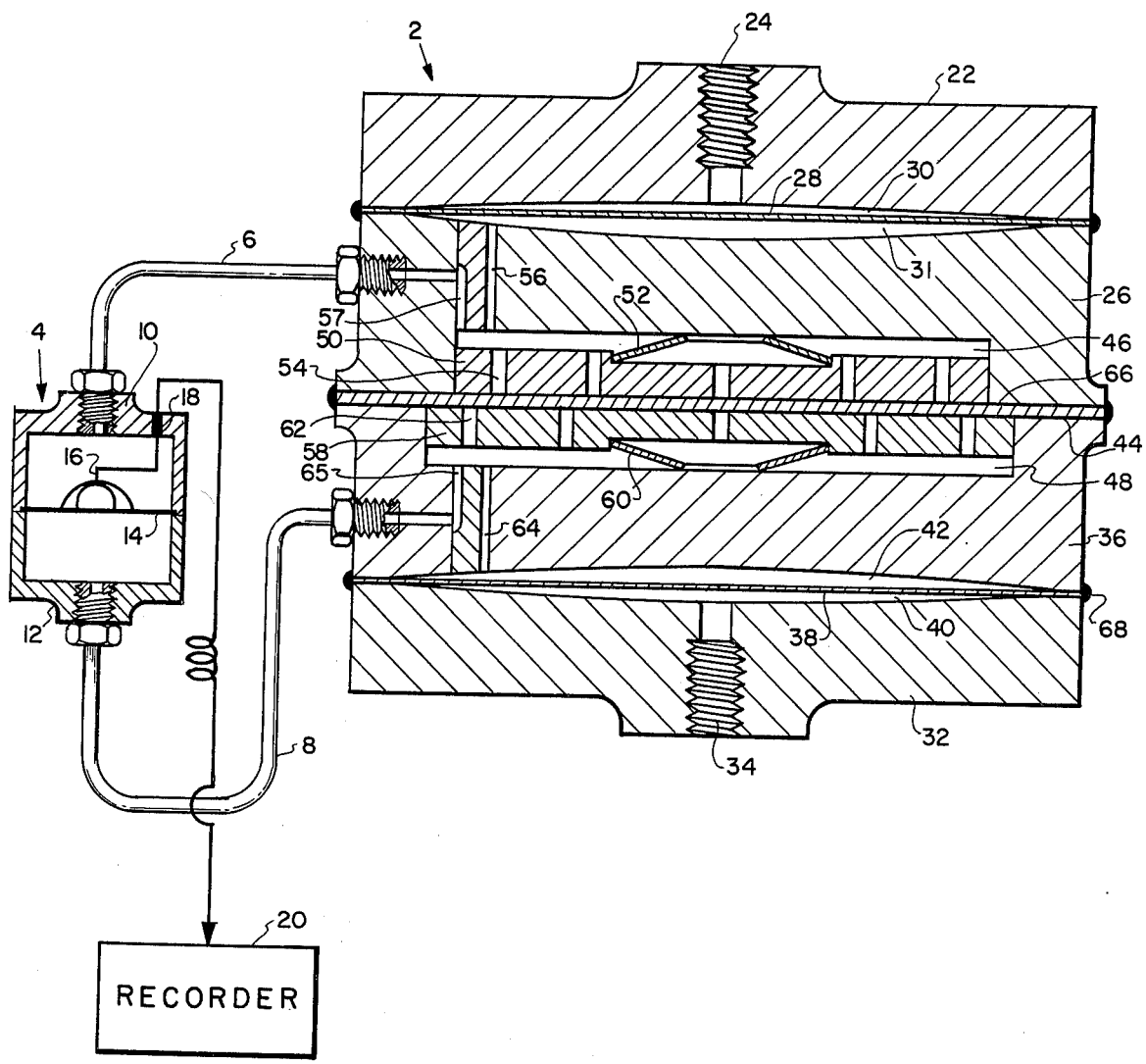

NON-SYMMETRICAL OVERLOAD PROTECTION DEVICE FOR DIFFERENTIAL PRESSURE TRANSMITTER

BACKGROUND OF THE INVENTION

1. Field of the Invention

The present invention relates to fluid pressure to electrical signal transducers. More specifically, the present invention relates to transducers which employ differential pressure sensors to produce an electrical signal dependent upon a difference between two applied fluid pressures and to a pressure overload protection for protecting the pressure sensor from excessive fluid pressures.

2. Description of the Prior Art

Differential pressure transducers, or transmitters, using a sensor which have only a small displacement over their operating range are well-known in the art as shown in the U.S. Pat. No. 3,712,143 of Weaver et al. In such a transmitter, the sensor is typically a strain-sensitive semiconductor wafer with means for applying pressurized fluids to respective sides of the wafer to produce a physical displacement of the wafer in response to a differential pressure of the fluids. Such differential pressure transmitters include a pair of barrier diaphragms with a fluid chamber on one side of one barrier diaphragm being pressurized with an input fluid having a first pressure and a similar fluid chamber on one side of the other barrier diaphragm being pressurized with a second input fluid having a second pressure. A respective interior chamber on the other side of each of the barrier diaphragms contains a respective substantially incompressible fill fluid. These fill fluids communicate through fluid passages with opposite respective sides of the sensor wafer, and the wafer is displaced or deflected by an amount which is dependent upon the difference between the two pressures of the fill fluids. The sensor wafer, in turn, produce an electrical output signal which is dependent upon the displacement and, hence, is representative of a differential pressure of the fill fluids which, in turn, is dependent on the differential pressure of the input fluids. Such transmitters have usually incorporated pressure overload protection to prevent the sensor wafers from being excessively displaced by overload input differential pressures which could damage the sensor wafer. Such overload protection arrangements in the prior art have been based on providing equal or similar overload protection in both directions of displacement of the sensor wafer. However, it has been found that such sensor wafers are not symmetrical in their requirements for overload protection and, hence, require a predetermined ratio of overload protection, i.e., a different overload protection in one displacement direction than the other displacement direction. As a result, the prior art overload protection has been arranged to provide protection based on the lowest displacement strength capability of the sensor wafer which inherently provided substantial over-protection of the higher displacement capability and required stronger wafers to provide a displacement capability at the lowest level which was adequate to withstand a desired input pressure range before overload protection was necessary. Consequently, it would be desirable to provide overload protection which would be correlated, or matched, to the ratio of protection requirements of the sensor wafer rather than operating with an excessive mismatch between the overload protection and the sensor wafer to be protected.

SUMMARY OF THE INVENTION

Accordingly, it is an object of the present invention to provide an improved differential pressure transmitter which has an overload protection for a differential pressure sensor that is matched to the requirement of the differential pressure sensor.

In accomplishing this and other objects, there has been provided, in accordance with the present invention a differential pressure transmitter having a spring loaded control diaphragm in a central cavity within a transmitter housing between two barrier diaphragms and having respective sides having pressure communication with corresponding ones of the barrier diaphragms. The control diaphragm is located between respective pressure applying means which are biased to apply respective overload threshold bias forces to the control diaphragm. The force applying means are arranged to provide a movement of the control diaphragm in one direction which is inhibited with respect to the movement of the control diaphragm in the other direction to provide a proportioning of the bias forces in a predetermined ratio.

BRIEF DESCRIPTION OF THE DRAWING

A better understanding of the present invention may be had when the following detailed description is read in connection with the accompanying drawing in which the single FIGURE is a cross-sectional illustration of a differential pressure transmitter having a pressure overload protection embodying an example of the present invention.

DETAILED DESCRIPTION

Referring to the single FIGURE drawing in more detail, there is shown a differential pressure transmitter having a pressure input head 2 connected to a remote pressure sensor capsule 4 by a pair of fluid carrying capillary tubes 6 and 8 extending between the head 2 and the capsule 4. The capsule 4 includes a pair of capsule blocks 10, 12 defining an interior volume. A diaphragm 14 with a conventional displacement to electrical signal conversion means (not shown) thereon to produce an electrical signal having an amplitude representative of differential pressure applied to the diaphragm 14 is used to divide the interior volume into two chambers with a fluid isolation therebetween. The displacement to electrical signal conversion means on the diaphragm 14 is connected by electrical wires 16 through a fluid-tight seal 18 in a wall of the capsule 4 to associated electrical apparatus, e.g., a recorder 20.

The sensor head 2 has a first place 22 with an input fluid pressure connection, or admitting, means therein, e.g., threaded hole 24. A second plate 26 is located adjacent to the first plate 22 and has a first barrier diaphragm 28 located between the first and second plate 22, 26. A concave face of the first plate 22 adjacent to the barrier diaphragm 28 defines a first space 30 while a concave face on the second plate 26 adjacent to the other side of the barrier diaphragm 28 defines a second space 31. A similar structure is located on the other side of the sensing head 2 and includes an outside third plate 32 having fluid admitting means 34, a fourth plate 26 and a second barrier diaphragm 38 located therebetween to define a third space 40 between the barrier diaphragm 38 and the outside third plate 32 and a fourth space 42 between the barrier diaphragm 38 and the inner fourth plate 36.

A control diaphragm 44 is located between the inner second and fourth plates 26, 36. The control diaphragm 44 is arranged to define a first inner space 46 between the control diaphragm and the inner second plate 26 and a second inner space 48 between the control diaphragm 44 and the inner fourth plate 36. A first substantially incompressible fill fluid (not shown) is arranged to fill the spaces 31 and 46 while a similar second fill fluid fills the spaces 42 and 48. A first pressure applying spacer 50 is located within the first space 46 and is positioned in contact with the adjacent face of the diaphragm 44 while being spaced from the adjacent face of the inner second plate 26. A Belleville washer 52 is located within the space 46 concurrently in contact with the diaphragm 44 and the plate 26 to apply spring pressure to the diaphragm 44. A plurality of holes in the washer 50 are arranged to conduct the fill fluid between the space 46 and the diaphragm 44. A first fluid channel 56 is arranged to conduct the first fill fluid between the space 31 and the space 46 while a second fluid channel 57 is arranged to conduct the first fill fluid between the space 46 and the capillary tube 6 extending between the head 2 and the capsule 4.

A similar structure is arranged on the other side of the control diaphragm 44 within the transmitter head 2. Specifically, a second pressure applying spacer 58 is located within the second space 48 and is positioned in contact with the adjacent face of the diaphragm 44 while being spaced from the adjacent face of the inner fourth plate 58. A second Belleville washer 60 is located within the space 48 concurrently in contact with the diaphragm 44 and the plate 58 to apply spring pressure to the diaphragm 44 in the opposite direction to that applied by the first Belleville washer 52. A plurality of holes 62 are located in the second washer 58 to conduct the second fill fluid between the space 48 and the diaphragm 44. A third fluid conduit 64 is arranged to provide a second fluid passage between the space 42 and the space 48 while a fourth fluid passage 65 is arranged to conduct the second fill fluid between the space 48 and the capillary tube 8 extending between the head 2 and the capsule 4.

The inner plates 26 and 36 are not symmetrical inasmuch as the openings or recesses within these plates for housing their respective washers, i.e., washers 50 and 58, respectively, have different respective diameter. This difference in diameter is effective to produce a peripheral step in the plate having the smaller diameter opening which step overlies a peripheral portion of the spacer in the plate having the larger diameter. For example, assuming that the plate 26 has the smaller diameter opening for housing the washer 50, a step 66 at the outer edge of the space, or recess, 46 overlies a peripheral portion of the spacer 58 in the recess 48. This step 66 produces a difference in operation of the overload protection in one relative relationship of input pressures as compared with opposite relative relationship of input pressures. Specifically, the step 68 will prevent a movement of the spacer 58 toward the inner second plate 26 by acting as a stop for the second spacer 58. The fill fluid in the space 48 can, at this time, pass through the holes 62 and move only the diaphragm 44 and the spacer 50. On the other hand, the fill fluid in the space 46 when in an overload pressure state can move the spacer 50, the diaphragm 44 and the spacer 58 against the spring pressure of the second Belleville washer 60.

A weld bead 68 is shown as a typical attachment means for the diaphragm 2 and adjacent plate while the layered structure forming the head assembly is retained in an operative configuration by any suitable means, e.g., nuts and bolts (not shown) passing through the plate layers.

In operation, the pressure transmitter of the present invention is arranged to apply input differential fluid pressures supplied through the fluid pressure connection means 24 and 34 to the sensor capsule 4 for conversion into an electrical signal amplitude by the sensor wafer 14. When an overload fluid input pressure is applied to the head 2, the spring force exerted by a corresponding opposing Belleville washer is exceeded and the control diaphragm 44 is moved to absorb the overload pressure. The Belleville washers 52, 60 are arranged to operate near a constant force region with the spring force being suitably proportioned, e.g., the spring force of the second Belleville washer 60 is greater than the spring force of the first Belleville washer 52. The pressure deflection curve of the diaphragm 44 can be tailored or controlled, by appropriate design of the Belleville washer 52, 60. Thus, when the overload differential pressure level is exceeded the net spring force exerted by the Belleville washers is overcome and the diaphragm 44 is displaced to allow an absorption of the fill fluid on the excess pressure side of the head 2 until the barrier diaphragm on that high pressure side bottoms against its adjacent inner plate. The bottoming of the barrier diaphragm prevents further increase in the differential pressure transmitted to the sensor 4. The barrier diaphragms are arranged by a suitable selection of the fluid volumes involved to bottom before the control diaphragm 44 and its associated spacers and Belleville washers reach the limit of their travel. For symmetrical overload differential pressures the Belleville spring force of the second Belleville washer 60 is arranged to be twice that of the first Belleville washer 52. In either case, the overload differential pressure protection in the direction where both spacers 50 and 58 move, i.e., the higher pressure is applied to the input connection 24, is defined as $$\Delta P = \frac{F2 - F1}{A}$$

where F2 is the spring pressure of the second Belleville washer 58 and F1 is the spring pressure of the first Belleville washer 52 while the A is the area of the diaphragm under the first spacer 50. In the reverse overload condition where the higher input pressure is applied to the input connection 34, the overload differential pressure equals F1/A. Thus, it may be seen that the overload protection provided by this overload structure is asymmetrical, i.e., a predetermined ratio, and is correlated by selecting spring pressures and diaphragm areas which correlate the overload protection to the requirements of the particular sensor wafer.

Accordingly, it may be seen, that there has been provided, in accordance with the present invention, an improved differential pressure transmitter having an overload protection for a pressure sensor which is matched to the requirements of the pressure sensor.

The embodiments of the invention in which an exclusive property or privilege are claimed is defined as follows:

1. A differential pressure transmitter comprising a housing having a central cavity with first inlet means for a first pressure signal and second inlet means for a second pressure signal, means for dividing said cavity for isolating said first signal from said second signal within said central cavity of said housing including a flexible diaphragm, first biasing means for subjecting said diaphragm to a bias force in a first direction corresponding to the direction of force produced by said first pressure signal, second diaphragm biasing means for subjecting said diaphragm to a second bias force opposite in direction to said first bias force and in the direction of said second pressure signal, and means for proportioning located adjacent to said diaphragm to affect the net effect of said first and second bias force on said diaphragm to produce said net effect of said first and second bias forces in a predetermined nonsymmetrical ratio.

2. A differential pressure transmitter as set forth in claim 1 and further including a differential pressure transducer arranged to be subjected to said first and second pressure signals to provide an output signal proportional to the difference between said first and second pressure signals, said pressure transducer having maximum force supporting capability in opposite directions in said ratio.

3. A differential pressure transmitter as set forth in claim 1 wherein said first biasing means includes a first spacer in said central cavity on one side of said control diaphragm and a first spring means arranged between said spacer and a wall of said cavity to urge said spacer against said control diaphragm, and said second biasing means includes a second spacer in said cavity on the opposite side of said control diaphragm from said first spacer and a second spring means located between said second spacer and a wall of said cavity to urge said second spacer against said control diaphragm on the opposite side of said control diaphragm from said first spacer.

4. A differential pressure transmitter as set forth in claim 3 wherein said means for proportioning includes a smaller diameter opening for housing said first spacer than the diameter of an opening for housing said second spacer with a peripheral edge of said first opening serving as a stop for said second spacer and said second spacer having holes therein to allow pressure signal communication of said second pressure signal to a surface of said control diaphragm.

5. A differential pressure transmitter as set forth in claim 4 and including a pressure transducer connected to said central cavity in said housing by capillary tubing to apply said first and second pressure signals to said transducer to provide an output signal proportional to the difference between said first and second pressure signals.

6. A differential pressure transmitter comprising a flexible overload element having a first surface and a second surface and arranged to have a first fluid in contact with said one surface and a second fluid in contact with said second surface to move said overload element in response to a difference in pressure applied by said first and second fluids, first biasing means for applying a first bias pressure to said first surface, a second bias means arranged to apply a second bias pressure to said second surface and means for proportioning located adjacent to said overload element to affect the net effect of said first and second bias pressures on said overload element to produce said net effect of said first and second bias pressures in a non-symmetrical ratio.

7. A differential pressure transmitter as set forth in claim 6 wherein said last-mentioned means includes means for restraining the effect of said second biasing means while allowing an unrestrained operation of said first biasing means.

8. A differential pressure transmitter as set forth in claim 6 and including a differential pressure transducer arranged to be subjected to said first and second pressure signals for providing an output signal proportional to the difference between said first and second pressure signals, said pressure transducer being remotely located from said transmitter and connected thereto by capillary tubing to conduct said first and second pressure signals to said pressure transducer.

9. A differential pressure as set forth in clam 8 wherein said pressure transducer has a maximum force supporting capability in opposite directions in said ratio.

10. A differential pressure transmitter as set forth in claim 8 wherein said output signal is an electrical signal having a differential pressure representative amplitude.

* * * * *